3,040,010
ALLYL GLYCIDYL ETHER AND VINYL ACETATE COPOLYMERS

Edward C. Shokal, Walnut Creek, and Paul A. Devlin and De Loss E. Winkler, Orinda, Calif., assignors to Shell Oil Company, a corporation of Delaware
No Drawing. Filed Mar. 24, 1958, Ser. No. 723,096
2 Claims. (Cl. 260—85.7)

This invention relates to a new and particularly useful class of copolymers of alkenyl glycidyl monoethers. The invention pertains to copolymers of allyl glycidyl ether with certain other polymerizable compounds and more particularly to copolymers of only allyl glycidyl monoether and vinyl acetate.

Allyl glycidyl ether contains two different groups and may be subjected to polymerization through two unrelated mechanisms. The compound may be subject to what is called oxy-polymerization by treatment with a Friedel-Crafts catalyst whereby joinder of the epoxy groups occurs so that the units are linked with ethereal oxygen linkages and the formed oxy-polymer is a substituted polyglycerol containing one allyloxy group linked to each glyceryl radical. On the other hand, the allyl glycidyl ether may be heated in the presence of a peroxide whereby carbo-polymerization occurs with joinder by carbon-to-carbon linkages of allyl groups to give a polymer containing a plurality of unaltered glycidyl radicals. The present invention is concerned primarily with carbo-copolymers formed by carbo-polymerization. Hereinafter the term polymerization and related terms will have reference to carbo-polymerization.

It was known prior to the present invention that allyl glycidyl ether could be homopolymerized, i.e., polymerized with itself alone by joinder of the allyl groups. However, such homopolymer is deficient in properties needed for many useful applications of the polymer. It was also known that allyl or methallyl glycidyl ether could be copolymerized with halogen-containing unsaturated compounds such as vinylidene chloride, alpha-chloronitrile and alpha-chloroacrylic esters. The glycidyl ether was incorpoarted into the structure of these copolymers for the particular purpose of stabilizing them against discoloration which results from the action of the hydrohalic acid spontaneously evolved from the halogen-containing copolymer. Since the glycidyl groups are destroyed by the hydrohalic acid evolved spontaneously from the halogen-containing copolymer, these copolymers are of no value for uses which involve application and presence of the epoxy group. Finally, it was further known that allyl glycidyl ether could be heated with maleic acid or anhydride to produce a resinous product. This product is an alkyl resin rather than a copolymer since little or no carbo-polymerization occurs during its production owing to the great activity with formation of ester groups of the epoxy group in the allyl glycidyl ether with the carboxylic acid or anhydride groups of the maleic acid or anhydride.

The invention claimed herein is one aspect of the broader invention disclosed herein and its parent applications, now issued as U.S. Patents Nos. 2,585,506 and 2,839,514. Broadly, the invention is concerned with a copolymer of an alkenyl glycidyl monoether and only at least one other neutral polymerizable compound containing a vinylidene group, which compound is free of other elements than carbon, hydrogen and oxygen. The term "neutral" is employed in customary chemical sense to mean neither acidic nor basic. Primarily, the invention encompasses the copolymers of allyl glycidyl monoether with only one or more other neutral polymerizable compounds containing a vinylidene group and no other elements than carbon, hydrogen and oxygen. In all cases, the copolymers contain unaltered three-membered epoxy rings such as is contained in a glycidyl radical wherein the two valence bonds of an oxygen atoms are each linked to directly adjacent or vicinal carbon atoms and thereby form a three-membered ring. Preferably, the copolymers contain a plurality of such epoxy groups.

The essential constituent of the copolymers is an alkenyl glycidyl monoether and while allyl glycidyl monoether is preferred for this purpose, related compounds are employed if desired. The related monoether may contain any alkenyl group such as a vinyl, propenyl, isopropenyl, methallyl, crotyl, 3-butenyl or oleyl radical, for example, there being no restriction on the position of the double bond, the number of carbon atoms or the isomeric structure thereof. Likewise, homologous glycidyl radicals may be present, as is the case with 1-methylglycidyl, 1-butylglycidyl, 2-methylglycidyl, 2-isopropylglycidyl, 2-hexylglycidyl, 3-methylglycidyl, or 3-isopentylglycidyl radicals, for instance, again there being no restriction on the number of carbon atoms or isomeric configuration thereof. Representative, but non-limiting, compounds employed as essential constituents in preparing the copolymers of the invention include allyl glycidyl monoether, methallyl glycidyl monoether, crotyl glycidyl monoether, tiglyl glycidyl monoether, vinyl glycidyl monoether, isopropenyl glycidyl monoether, 4-pentenyl glycidyl monoether, 3-buten-2-yl glycidyl monoether, allyl 2-methylglycidyl monoether, methallyl 3-isopropylglycidyl monoether, vinyl 2-ethylglycidyl monoether, oleyl 3-methylglycidyl monoether, and the like. A desirable sub-group of the general class is an alkenyl glycidyl monoether having the olefinic double bond between the second and third carbon atoms of the alkenyl group with the third carbon atom being the carbon atom of a terminal methylene group, which monoether contains 6 to 10 carbon atoms. More generally, it is preferred that the alkenyl group of the alkenyl glycidyl monoether have the olefinic double bond joined to the second carbon atom thereof owing to greater ease of polymerizing compounds of such structure than with compounds having the olefinic double bond more remotely situated from the ethereal oxygen atom.

Whereas in the invention claimed herein the other compound with which the allyl glycidyl ether is copolymerized is only vinyl acetate, in the broader aspect the other compound or compounds with which the allyl glycidyl or related monoether is copolymerized may be any neutral polymerizable compound containing a vinylidene group ($CH_2=C<$) and free of other elements than carbon, hydrogen and oxygen. The compound necessarily contains carbon and hydrogen, but may or may not contain oxygen. While the compound itself is neutral, it is not meant that use of usual organic chemicals which may contain traces of acids or bases as impurities shall be unreasonably excluded from the scope of the invention. The compound may contain only one or any plurality of vinylidene groups, although in general it is preferred that the compound contain only one to two vinylidene groups. Besides vinylidene-containing hydrocarbons, the compound may be, for example, a vinylidene-containing aliphatic, aromatic, alicyclic and/or oxyheterocyclic alcohol, aldehyde, ketone, ester or ether, but in being a neutral compound, it is not a phenol, carboxylic acid or carboxylic acid anhydride. Representative, but non-limiting, compounds include ethylene, isobutylene, allene, butadiene, isoprene, vinylacetylene, styrene, isopropenyl benzene, divinylbenzene, vinylcyclohexane, allylpyran, allyl alcohol, methallyl alcohol, cinnamyl alcohol, acrolein, methacrolein, methyl vinyl ketone, methyl isopropenyl ketone, acrylophenone, divinyl ketone, vinyl acetate, vinyl oleate, allyl formate, allyl acetate, methallyl butyrate, allyl glycolate, allyl acrylate, diallyl oxalate, diallyl maleate, diallyl phthalate, diallyl diglycolate, triallyl citrate, divinyl phthalate, allyl vinyl succinate, allyl crotyl phthalate, diallyl tartrate, diallyl malonate, methyl methacrylate, ethyl acrylate, stearyl acrylate, ethylene glycol dimethacrylate, divinyl ether, diallyl ether, allyl methyl ether, ethylene glycol diallyl ether, glyceryl triallyl ether, etc. Athough the allyl glycidyl or related monoether may be copolymerized with any other polymerizable compound desired of the above-defined class, it is much preferred that the other compound be a hydrocarbon, alcohol, ester and/or ether. It is also preferred that the vinylidene-containing group in the compound be a vinyl or allyl group.

While copolymers can be prepared by copolymerizing a mixture consisting of allyl glycidyl or related monoether with any number of other neutral polymerizable vinylidene containing compounds free of other elements than carbon, hydrogen and oxygen, it is preferred that only one to two of the other compounds be copolymerized with the monoether. Particularly useful copolymers are prepared from bimixtures such as allyl glycidyl monoether and styrene, diallyl ether or vinyl acetate. For many applications it is advantageous to use termixtures of the monoether with allyl alcohol and another compound such as vinyl acetate, styrene or an allyl ester.

The copolymers of the invention are prepared by heating the mixture of monomers in the presence of a polymerization catalyst having an oxygen atom linked directly to another oxygen atom, which catalyst is no more acidic than acetic acid, as is the case with benzoyl peroxide, acetyl peroxide, cumene hydroperoxide, lauroyl peroxide, tertiary-butyl hydroperoxide, di-tertiary-butyl peroxide, 2,2-bis(tertiary-butyl peroxy) butane and like peroxides, as well as molecular oxygen, relatively pure or diluted with inert gas, e.g., nitrogen, methane, etc. When using peroxides, about 0.1% to 5% is suitable, although larger or smaller proportions may be employed if desired. Molecular oxygen is used as catalyst by bubbling or dispersing the gas into and through the liquid polymerizing mixture. The amount of oxygen employed may be varied over extremely wide limits with little or no effect on the course of the copolymerization.

The copolymerization is conducted with the polymerizing mixture in liquid phase at about 50° C. to 300° C. Ordinary reflux temperature is often convenient although this temperature is usually too low to effect the copolymerization with desired rapidity. Consequently, it is usually preferable to operate at about 125° C. to 250° C., at which temperatures it may be necessary to employ superatmospheric pressure, such as from 100 to 300 pounds per square inch or even higher in order to keep the polymerizing mixture in liquid phase.

While it is usually desirable to effect the polymerization without the presence of other added substances than the polymerizing compounds and the catalyst, it is sometimes convenient to also have present an inert solvent, such as hexane, benzene, toluene, or xylene. The use of such inert solvents is advantageous for enabling the polymerizing mixture to be fluidly liquid under the polymerizing conditions with compounds of higher molecular weight.

In some cases, the copolymerization is effected by adding one or more of the compounds to the polymerizing mixture during the course of the copolymerization. This procedure is especially useful with mixtures wherein one compound polymerizes at a much faster rate than the other. In such cases, the faster polymerizing compound is added continuously or intermittently during the copolymerization.

Depending upon the use to which the copolymer is put, the proportion of allyl glycidyl or related monoether to the other polymerizable compound or compounds is varied to considerable extent in the mixture subjected to copolymerization. In some cases it is desirable to have a copolymer with a large epoxide content while in others, the epoxide content is desired to be low. Although the formed copolymer will not necessarily contain the same proportion of glycidyl ether as present in the monomer mixture from which it was derived, use of about 5% to 95% of the monoether in the monomer mixture is employed. In broad aspect, the copolymers of the invention contain unaltered epoxy groups of the glycidyl monoether so that the copolymers have an epoxide value of from 0.01 equivalent of epoxide per 100 grams up to 90% of the theoretical epoxide value of the glycidyl monoether. Copolymers with up to 50% of the theoretical value have excellent properties. The copolymers thus possess an appreciable amount of epoxide content while at the same time they also contain chemically combined in the macromolecules thereof, a substantial proportion of polymerizable compounds other than are derived from the glycidyl monoether and thereby have their properties favorably changed to unexpected extent. While the macromolecules of the copolymers preferably contain a plurality of epoxy groups which are three-membered rings, they may contain only one group.

In those cases of coplymers of allyl glycidyl monoether and only one other compound, such as styrene, acrolein, diallyl monoether and the like, the copolymers with excellent properties have epoxide values from about 0.1 to 0.6 epoxide equivalent per 100 grams of copolymer. Very suitable copolymers of allyl glycidyl monoether, allyl alcohol and one other of the polymerizable compound such as styrene or vinyl acetate have epoxide values of from about 0.01 to 0.5 epoxide equivalent per 100 grams.

The epoxide value referred to herein as so many epoxide equivalents per 100 grams of polymer is determined in the following manner. Dry hydrogen chloride gas in amount of about 35 grams is slowly bubbled into and absorbed by a solution of 75 grams pyridine in 400 ml. dry chloroform cooled in an ice-water bath. After the absorption, a sample of the solution is titrated with standardized 0.5 N methanol solution of sodium hydroxide, and then pyridine suffiicient to neutralize free hydrogen chloride, if any, is added to the solution so about a 5% excess of pyridine is present. The solution is then diluted with chloroform to one liter and the normality checked by titration using phenolphthalein as indicator. To determine the epoxide value of a copolymer, a stoichiometric excess of the standardized pyridinium chloride solution is added to a weighed sample of copolymer and the mixture is boiled under a reflux condenser for 30 minutes whereby the pyridinium chloride hydrochlorinates the epoxy groups to chlorhydrin groups. After cooling, the excess pyridinium chloride is back titrated with the standardized 0.5 N methanolic sodium hydroxide to the phenolphthalein end point. The epoxide value is calculated by considering one HCl of the reacted pyridinium chloride as equivalent to one epoxide group.

In preparing the copolymers, the polymerization of the entire monomer mixture is ordinarily not carried to completion. Instead, copolymerization is usually continued until about 10% to 80% of the monomer mixture is converted to copolymer and then the unpolymerized monomers are separated from the formed copolymer by distillation, preferably under reduced pressure. The copolymer obtained in this manner is substantially free of unpolymerized monomers, and solvents, if the latter are employed. The separated copolymers vary from viscous liquids to brittle solids in consistency.

The following examples illustrate the invention, but it is to be understood that the scope of the invention is not to be construed as limited to details therein. The parts are by weight. The molecular weights referred to were determined by ebullioscopic method. Such methods are described, for example, in Chapter III of "Number-Average Molecular Weights" by Bonner, Dimbat and Stross, Interscience Publishers, N.Y. (1958).

*Example 1*

A mixture consisting of 20 parts styrene and 80 parts allyl glycidyl ether was heated under reflux at 150° C.

to 160° C. for thirteen hours while bubbling a slow stream of air through the solution. The product was then distilled to a kettle temperature of 160° C. under 1 mm. Hg pressure. The light yellow, extremely viscous copolymer was obtained in 38% conversion and had an epoxide value of 0.34 equivalent per 100 grams.

A hard product was obtained upon heating the resin for 40 minutes at 150° C. in admixture with an added small amount of diethyl triamine or sodium phenoxide.

Example 2

To 90 parts of allyl glycidyl ether heated under reflux at 150° C. to 155° C. and catalyzed by a stream of air bubbles was added 10 parts of styrene in 10 equal portions one hour apart. After refluxing in the presence of the air stream for an additional two hours, the volatiles were removed by distilling up to a kettle temperature of 150° C. under 0.5 mm. Hg. A clear-yellow viscous copolymer was obtained in a conversion of 19.6%. Analysis showed the copolymer to contain 42% styrene. The copolymer also had an epoxide value of 0.44 equivalent per 100 grams, an iodine value of 24 grams iodine per 100 grams and contained 74.2% carbon and 8.2% hydrogen.

Example 3

A mixture of 90 parts allyl glycidyl ether and 10 parts of styrene was heated for 2 hours at 125° C. under 100 pounds per square inch pressure while bubbling air therethrough. Distillation in vacuo was employed to free the copolymer of volatiles. The conversion to copolymer was 12.1% and analysis showed the copolymer to contain 59% styrene.

The solid brittle copolymer had an epoxide value of 0.26 equivalent per 100 grams and a Durran's Mercury Method softening point of 61.5° C.

Example 4

In order to reduce the possibility of oxidation, a mixture of 90 parts of allyl glycidyl ether and 10 parts of styrene was heated up to 150° C. under a blanket of nitrogen and then maintained at that temperature under a pressure of 260 pounds per square inch while bubbling a slow stream of air through the mixture. The formed copolymer was recovered in a 31% conversion by distilling the volatiles therefrom in vacuo. The viscous copolymer contained 31.5% styrene, had a molecular weight of 900 and an epoxide value of 0.43 equivalent per 100 grams.

Example 5

A mixture of 90 parts allyl glycidyl ether and 10 parts styrene was heated for 1 hour at 225° C. under 120 pounds per square inch pressure while bubbling air therethrough. The copolymer recovered by distillation in vacuo at 52.9% conversion was a very viscous material having a styrene content of 19%, an epoxide value of 0.47 equivalent per 100 grams, a molecular weight of 635, and contained 67.3% carbon and 8.3% hydrogen.

Example 6

A mixture of 95 parts allyl glycidyl ether, 5 parts styrene and 1.2 parts cumene hydroperoxide was heated in a closed vessel for one hour at 180° C. A conversion of 12.8% to copolymer was obtained. The copolymer contained 33.6% styrene, was of viscous consistency, had a molecular weight of 630 and had an epoxide value of 0.50 equivalent per 100 grams.

Example 7

A mixture of 80 parts of allyl glycidyl ether, 20 parts styrene and 1.4 parts cumene hydroperoxide was heated in a closed vessel at 180° C. for two hours. The resulting copolymer obtained in a 26.4% conversion was a brittle solid containing 69.4% styrene, and having a molecular weight of 1090, an epoxide value of 0.254, and a Durran's Mercury Method softening point of 60° C.

Example 8

The copolymerization described in Example 7 was repeated with a mixture of 65 parts allyl glycidyl ether, 35 parts styrene and 1.4 parts cumene hydroperoxide. A conversion of 41% to copolymer was obtained which was a brittle solid containing 80.5% styrene and having a molecular weight of 1150, an epoxide value of 0.16 equivalent per 100 grams, and a Durran's Mercury Method softening point of 73° C.

Example 9

A mixture of 10 parts allyl glycidyl ether, 80 parts allyl alcohol and 10 parts styrene was heated for 2 hours at 180° C. under a pressure of 120 pounds per square inch while bubbling air therethrough. The formed copolymer obtained in 28.2% conversion was a brittle solid containing 34.1% styrene and having a molecular weight of 629, an epoxide value of 0.01 equivalent per 100 grams, a hydroxyl value of 0.76 equivalent per 100 grams, and a Durran's Mercury Method softening point of 58° C.

Example 10

A mixture of 30 parts allyl glycidyl ether, 60 parts allyl alcohol and 10 parts styrene was copolymerized as described in Example 9 whereby a semi-solid copolymer was obtained in 36.8% conversion. The copolymer had a molecular weight of 850, an epoxide value of 0.078 equivalent per 100 grams, a hydroxyl value of 0.077 equivalent per 100 grams and a Durran's Mercury Method softening point of 51° C. It contained 69.7% carbon and 8.9% hydrogen.

Example 11

A mixture of 50 parts allyl glycidyl ether, 25 parts allyl alcohol, and 25 parts styrene was heated for 1 hour at 180° C. under a pressure of 100 pounds per square inch in the presence of bubbled air. The resulting copolymer was a semi-solid and was obtained in a conversion of 37.3%.

Example 12

A mixture of 80 parts allyl glycidyl ether, 10 parts allyl alcohol, and 10 parts styrene was copolymerized as described in Example 11. A viscous copolymer was obtained in 23.6% conversion which contained 44.7% styrene and had a molecular weight of 760, an epoxide value of 0.40 equivalent per 100 grams, and a hydroxyl value of 0.22 equivalent per 100 grams. The copolymer contained 71.8% carbon and 8.4% hydrogen.

Example 13

A mixture of 25 parts allyl glycidyl ether and 75 parts diallyl ether was heated in the presence of bubbled air for one hour at 225° C. under a pressure of 180 pounds per square inch. The copolymer obtained in 74% conversion was an extremely viscous material. Analysis of the volatiles recovered by distillation in vacuo showed the copolymer to contain about 19% allyl glycidyl ether. The copolymer had a molecular weight of 851, an epoxide value of 0.16 equivalent per 100 grams, and an iodine number of 57 grams iodine per 100 grams. The copolymer contained 68.1% carbon and 9.4% hydrogen.

Example 14

A mixture of 70 parts allyl glycidyl ether and 30 parts diallyl ether was copolymerized as described in Example 13 whereby there was obtained a conversion to copolymer of 62% which had a viscosity greater than 148 poises at 25° C., a molecular weight of 701, an epoxide value of 0.35 equivalent per 100 grams, and an iodine number of 40 grams iodine per 100 grams. The copolymer containing about 68% allyl glycidyl ether also contained 64.7% carbon and 8.9% hydrogen.

Example 15

A mixture of 90 parts allyl glycidyl ether and 10 parts diallyl ether was heated with bubbled air for one hour at about 220° C. under a pressure of 120 pounds per square inch. Copolymer was obtained in 50.2% conversion and contained about 92% allyl glycidyl ether. The copolymer had a viscosity of about 80 poises at 25° C. a molecular weight of 583, an epoxide value of 0.53 equivalent per 100 grams, and an iodine number of 35 grams iodine per 100 grams. Analysis showed the presence of 63.3% carbon and 8.7% hydrogen.

*Example 16*

A mixture of 90 parts allyl glycidyl ether and 10 parts diallyl ether was heated under reflux at 141° C. while bubbling air therethrough for 24.5 hours. The resulting copolymer was a viscous liquid.

*Example 17*

A mixture of 90 parts allyl glycidyl ether and 10 parts allyl benzoate was heated in the presence of bubbled air for one hour at about 225° C. under a pressure of 120 pounds per square inch, whereby the conversion of copolymer was 49.7%. The copolymer contained about 13% allyl benzoate. It was a viscous liquid having a molecular weight of 572, an epoxide value of 0.48 equivalent per 100 grams, and an ester value of 0.16 equivalent per 100 grams. The copolymer contained 63.2% carbon and 8.2% hydrogen.

*Example 18*

A solution of 10 parts allyl glycidyl ether, 40 parts vinyl acetate, 50 parts toluene, and 2 parts tertiary-butyl perbenzoate was heated at 90–95° C. for 25 hours and a conversion of 44.5% to copolymer was obtained. The copolymer was a tacky brittle solid having a molecular weight of 3650, an epoxy value of 0.16 equivalent per 100 grams and an ester value of 0.88 equivalent per 100 grams.

*Example 19*

A mixture of 20 parts allyl glycidyl ether, 40 parts vinyl acetate and 40 parts allyl alcohol was heated for 2 hours at 180° C. under a pressure of 200 pounds per square inch in the presence of bubbled air whereby there was produced a 45.3% conversion to copolymer which was a semi-solid having a molecular weight of 707, an epoxide value of 0.065 equivalent per 100 grams, a hydroxyl value of 0.54 equivalent per 100 grams, and an ester value of 0.45 equivalent per 100 grams. Analysis also showed the presence of 60.0% carbon and 8.4% hydrogen.

*Example 20*

A like mixture of monomers to that described in Example 19 was heated with bubbled air for two hours at 140° C. under a pressure of 140 pounds per square inch. The copolymer was obtained in a conversion of 23% and had a molecular weight of 785, an epoxide value of 0.08 equivalent per 100 grams, and a hydroxyl value of 0.59 equivalent per 100 grams.

*Example 21*

A mixture of 900 grams of vinyl acetate and 100 grams of allyl glycidyl ether is charged, in 1000 grams of benzene, to a 3 liter glass kettle fitted with a thermometer and reflux condenser. The contents of the reactor are reacted at 75–78° C. for five hours in the presence of 20 grams of benzoyl peroxide. The recovered polymer at 69% conversion, has a molecular weight of about 5000 and an epoxy value of about .08 equivalence per 100 grams. The polymer, which is a light yellow solid, contains 57.1% carbon and 7.2% hydrogen; it contains 9% of allyl glycidyl ether and 4 epoxy groups per mole.

*Example 22*

A mixture of 25 parts allyl glycidyl ether, 25 parts methyl methacrylate, 50 parts xylene, and 2 parts di-tertiary-butyl peroxide was heated under reflux at 130° C. for 24.5 hours so as to produce a conversion to copolymer of 69.4%. The brittle copolymer containing about 24% allyl glycidyl ether had a molecular weight of 1200, an epoxide value of 0.19 equivalent per 100 grams, and an ester value of 0.06 equivalent per 100 grams.

*Example 23*

A mixture of 90 parts allyl glycidyl ether and 10 parts acrolein was heated at 180° C. under a pressure of 200 pounds per square inch in the presence of bubbled air. A conversion of 50.1% viscous copolymer was obtained. It had a molecular weight of 1020, an epoxide value of 0.47 equivalent per 100 grams, and a carbonyl value of 0.14 equivalent per 100 grams. Analysis gave 62.4% carbon and 8.4% hydrogen.

*Example 24*

A mixture of 20 parts allyl glycidyl ether, 60 parts allyl alcohol, 20 parts diallyl phthalate and 1.4 parts cumene hydroperoxide was heated at 180° C. for three hours in a closed vessel. The conversion to copolymer was 18.2%. The copolymer had an epoxide value of 0.02 equivalent per 100 grams and a hydroxyl value of 0.22 equivalent per 100 grams. It was a viscous liquid.

*Example 25*

A mixture of 20 parts allyl glycidyl ether, 60 parts allyl alcohol, 20 parts allyl tertiary-butylbenzoate, and 1.4 parts cumene hydroperoxide was heated in a closed vessel for three hours at 180° C. The resulting viscous copolymer was obtained in 11.2% conversion. It had an epoxide value of 0.04 equivalent per 100 grams and a hydroxyl value of 0.54 equivalent per 100 grams.

The copolymers of the invention, owing to their unexpected properties, have applications wherein use and advantage is taken of the new properties. In view of the fact that they contain epoxy groups, they may be mixed with other compounds containing radicals reactive with the epoxy groups whereby valuable resinous materials are obtained which are particularly useful as protective coatings. In addition, the absence in the copolymers of halogen which leads to destruction of the epoxy groups as mentioned hereinbefore, enables the copolymers to be employed in uses where a resinous polymer is desired that has continued existence of unaltered epoxy groups.

By adding an amine to the copolymer and baking the mixture a resinous material excellent for surface coating uses is obtained. For this purpose various amines may be employed, such as ethylene diamine, diethylene triamine, triethylamine, diethylamine, isopropylamine, piperidine, dicyandiamide, melamine and the like. About 2% to 20% of the amine is admixed with the copolymer preferably in the presence of inert solvents which are allowed to evaporate from the mixture after application to a surface and the obtained film is then baked at about 100° C. to 200° C. in order to cure the composition. An example of this use and superiority of the copolymer is given below.

*Example 26*

The allyl glycidyl ether-styrene copolymer prepared as described in Example 2 was admixed with an added 5% of diethylene triamine in a solution of equal parts by weight of xylene and methyl cellulose acetate. The solution was applied to a tin plated strip of sheet steel and cured by baking for 30 minutes at 150° C. The resulting film was hard, tough and flexible. It was not marred upon scratching with a fingernail edge. No raising or breaking of the cured film was encountered upon bending the coated strip 180° over a one-eighth inch mandrel.

For purposes of comparison, homopolymer of allyl glycidyl ether was prepared by heating the ether at reflux (155° C.) while bubbling air therethrough for 40 hours. The recovered homopolymer was obtained in a conversion of 53% upon distillation of the reaction mixture in vacuo and had an epoxide value of 0.50 epoxide equivalent per 100 grams.

Solutions of the poly(allyl glycidyl ether) were prepared as described above, one with an added 5% and another with an added 10% of diethylene triamine. The solutions were then coated on tin plated metal strips and also baked for 30 minutes at 150° C. The film from the composition containing the 5% amine was not useful for surface coating purposes because it was unduly soft in that it was readily marred by the edge of a fingernail. Furthermore, the composition containing the 10% amine lacked the important property of flexibility. Upon the strip being bent 180° over a one-eighth inch mandrel, the entire film broke across the bend.

The copolymers may also be cured by heating in admixture with other basic substances such as sodium hydroxide or sodium phenoxide, as well as with acidic curing agents like phosphoric acid, butyl dihydrogen phosphate, oxalic acid, phthalic anhydride and the like. Exceptionally satisfactory protective coatings are obtained by mixing about 0.5 to 2 parts of urea-formaldehyde resin with the copolymer and baking the mixture. For this purpose, alkylated resin made by condensing urea and formaldehyde in admixture with a lower alcohol such as butyl alcohol in usual fashion is particularly useful.

Cured resinous materials obtained by baking urea-formaldehyde condensates in admixture with homopolymer of allyl glycidyl ether are unfortunately not colorless; they are yellowish and thus not useful. It was, therefore, unexpected to discover upon baking copolymers of the invention in admixture with urea-formaldehyde resin that odorless cured compositions were obtained. Furthermore, this unexpected result is not unique to copolymers of allyl glycidyl ether with only a particular other polymerizable compound, as is evident from results with representative copolymers described in the following example.

*Example 27*

Homopolymer of allyl glycidyl ether was prepared by heating the ether in the presence of bubbled air at 220° C. to 230° C. for one hour under a pressure of 120 pounds per square inch. The resulting separated polymer had an epoxide value of 0.56 equivalent per 100 grams. It was a very viscous liquid.

Coatings were prepared by mixing in solvent equal parts by weight of the homopolymer or copolymers with a butylated urea-formaldehyde resin known in the art as Beetle 227-8 made by condensing urea with formaldehyde and n-butyl alcohol, applying the solution to tin plated sheet steel, and baking as described in the following table. The color of the resulting hard flexible films was then observed.

| Polymer | Prepared as Described in Example | Baking Temp., ° C. | Baking Time, Min. | Color |
|---|---|---|---|---|
| Allyl glycidyl ether homopolymer. | 27 | 175 | 15 | yellow. |
| Do. | 27 | 175 | 30 | Do. |
| Allyl glycidyl ether-diallyl ether copolymer. | 14 | 175 | 15 | colorless. |
| Do. | 14 | 175 | 30 | Do. |
| Allyl glycidyl ether-acrolein copolymer. | 23 | 150 | 15 | Do. |
| Do. | 23 | 150 | 30 | Do. |
| Allyl glycidyl ether-allyl alcohol-vinyl acetate copolymer. | 19 | 175 | 15 | Do. |
| Do. | 19 | 175 | 30 | Do. |

The copolymers are also very useful for imparting durability, gloss and adhesion when employed in admixture with other film forming plastics such as nitrocellulose, cellulose acetate, vinyl chloride polymers and the like. Such use is illustrated in the following examples.

*Example 28*

Equal parts by weight of ½ sec. R.S. nitrocellulose and Example 14 allyl glycidyl ether-diallyl ether copolymer or Example 5 allyl glycidyl ether-styrene copolymer were applied as films in solution to glass panels and the solvent evaporated therefrom. The resulting clear film in both cases had 98% gloss after one week, and after weathering for one month out of doors the appearance of both films was good with no flaking or peeling evident.

*Example 29*

Equal parts by weight of cellulose acetate and the Example 14 copolymer or the Example 5 copolymer were applied as films to glass panels as described in Example 28. The resulting films in both cases were clear. The percentage gloss after one week for both was about 95. After one month's weathering, there was no flaking or peeling of the films which had good appearance.

*Example 30*

Equal parts by weight of 87% vinyl chloride, 13% vinyl acetate copolymer known as Vinylite VYHH and Example 14 copolymer or Example 5 copolymer were applied as films to glass panels as described in Example 28. Clear films were obtained in both cases which had 98% gloss after one week's time.

This application is a continuation-in-part of our copending application Serial No. 34,346, filed June 21, 1948, now U.S. Patent No. 2,585,506 and Serial No. 163,778, filed May 23, 1950, now U.S. Patent No. 2,839,514.

We claim as our invention:

1. A copolymer of only allyl glycidyl monoether and vinyl acetate, produced by copolymerization in the presence of a polymerization catalyst having an oxygen atom linked directly to another oxygen atom which catalyst is no more acidic than acetic acid, said copolymer containing three-membered epoxy rings and having an epoxy value up to 90% of the theoretical value of said ether.

2. A copolymer of only allyl glycidyl monoether and vinyl acetate, produced by copolymerization in the presence of a polymerization catalyst having an oxygen atom linked directly to another oxygen atom which catalyst is no more acidic than acetic acid, said copolymer being a solid, having a molecular weight of 3650, having an epoxy value of 0.16 equivalent per 100 grams and having an ester value of 0.88 equivalent per 100 grams.

References Cited in the file of this patent

UNITED STATES PATENTS

| | | |
|---|---|---|
| 2,450,234 | Evans et al. | Sept. 28, 1948 |
| 2,599,817 | Evans et al. | June 10, 1952 |
| 2,650,151 | Ham | Aug. 25, 1953 |
| 2,788,339 | Rothrock et al. | Apr. 9, 1957 |